(12) United States Patent
Scherer et al.

(10) Patent No.: US 9,691,411 B2
(45) Date of Patent: Jun. 27, 2017

(54) SYSTEM AND METHOD FOR ASSESSING SUICIDE RISK OF A PATIENT BASED UPON NON-VERBAL CHARACTERISTICS OF VOICE DATA

(71) Applicant: Children's Hospital Medical Center, Cincinnati, OH (US)

(72) Inventors: Stefan Scherer, Cincinnati, OH (US); John P. Pestian, Cincinnati, OH (US); Louis-Philippe Morency, Cincinnati, OH (US)

(73) Assignees: CHILDREN'S HOSPITAL MEDICAL CENTER, Cincinnati, OH (US); UNIVERSITY OF SOUTHERN CALIFORNIA, Los Angeles, CA (US)

( * ) Notice: Subject to any disclaimer, the term of this patent is extended or adjusted under 35 U.S.C. 154(b) by 0 days.

(21) Appl. No.: 14/893,253

(22) PCT Filed: May 23, 2014

(86) PCT No.: PCT/US2014/039357
§ 371 (c)(1),
(2) Date: Nov. 23, 2015

(87) PCT Pub. No.: WO2014/190269
PCT Pub. Date: Nov. 27, 2014

(65) Prior Publication Data
US 2016/0099011 A1    Apr. 7, 2016

Related U.S. Application Data

(60) Provisional application No. 61/827,056, filed on May 24, 2013.

(51) Int. Cl.
*G10L 17/16* (2013.01)
*G10L 25/18* (2013.01)
(Continued)

(52) U.S. Cl.
CPC ............. *G10L 25/63* (2013.01); *G10L 17/16* (2013.01); *G10L 17/26* (2013.01); *G10L 25/18* (2013.01); *G10L 25/21* (2013.01)

(58) Field of Classification Search
CPC ......... G10L 17/26; G10L 25/90; G10L 17/16; G10L 25/18; G10L 25/21; G10L 25/63
See application file for complete search history.

(56) References Cited

U.S. PATENT DOCUMENTS

| | | | | |
|---|---|---|---|---|
| 4,675,904 A | * | 6/1987 | Silverman | G10L 17/26 600/586 |
| 5,148,483 A | * | 9/1992 | Silverman | G10L 17/26 704/274 |

(Continued)

OTHER PUBLICATIONS

Venek, Verena, et al. "Adolescent suicidal risk assessment in clinician-patient interaction: A study of verbal and acoustic behaviors." Spoken Language Technology Workshop (SLT), 2014 IEEE. IEEE, 2014.*

(Continued)

*Primary Examiner* — Matthew Baker
(74) *Attorney, Agent, or Firm* — Mintz Levin Cohn Ferris Glovsky and Popeo, P.C.; Muriel Liberto, Esq.

(57) ABSTRACT

A method for assessing suicide risk for a human subject including receiving recorded voice data of the subject; and classifying the subject as suicidal or non-suicidal based upon a computerized analysis of one or more nonverbal characteristics of the speech data, especially features associated with a breathy phonation type. The analysis of the nonverbal characteristics of the voice data can include an analysis of acoustic characteristics of speech, and/or an analysis of prosodic and voice quality-related features of the voice data. Related apparatus, systems, techniques and articles are also described.

6 Claims, 3 Drawing Sheets

(51) Int. Cl.
  *G10L 25/21* (2013.01)
  *G10L 25/63* (2013.01)
  *G10L 17/26* (2013.01)

(56) References Cited

U.S. PATENT DOCUMENTS

| | | | |
|---|---|---|---|
| 5,976,081 A * | 11/1999 | Silverman | G10L 17/26 |
| | | | 600/300 |
| 2002/0077825 A1 * | 6/2002 | Silverman | G10L 17/26 |
| | | | 704/270 |
| 2003/0078768 A1 * | 4/2003 | Silverman | G10L 17/26 |
| | | | 704/206 |
| 2007/0233468 A1 | 10/2007 | Ozdas et al. | |
| 2007/0233498 A1 | 10/2007 | Silverman et al. | |
| 2012/0288068 A1 | 11/2012 | Jaiswal et al. | |

OTHER PUBLICATIONS

Scherer, Stefan, John Pestian, and Louis-Philippe Morency. "Investigating the speech characteristics of suicidal adolescents." 2013 IEEE International Conference on Acoustics, Speech and Signal Processing. IEEE, 2013.*

Ozdas, Asli, et al. "Investigation of vocal jitter and glottal flow spectrum as possible cues for depression and near-term suicidal risk." IEEE Transactions on Biomedical Engineering 51.9 (2004): 1530-1540.*

International Search Report issued in PCT/US2014/039357 on Sep. 24, 2014.

* cited by examiner

SYSTEM AND METHOD FOR ASSESSING SUICIDE RISK OF A PATIENT BASED UPON NON-VERBAL CHARACTERISTICS OF VOICE DATA

RELATED APPLICATIONS

This application is a national stage application, filed under 35 U.S.C. §371, of International Application No. PCT/US2014/039357 filed on May 23, 2014, which claims priority to U.S. Provisional Application No. 61/827,056 filed May 24, 2013, the contents of which are hereby fully incorporated by reference.

FIELD

The present invention relates to clinical decision support in psychiatry, and particularly to systems and methods for assessing suicide risk.

BACKGROUND

Suicide among adolescents, which for the past 10 years has been the second most frequent cause of death among 12- to 17-year-olds, is a serious issue.

Suicide risk factors may include family history, demographics, mental illness co-morbidities, and nonverbal behavior and cues. There are, however, no standardized approaches for analyzing these nonverbal behaviors, which traditionally include gestures, facial expressions, and voice characteristics.

Several researchers have investigated the correlation between severe depression, suicide, and the characteristics of speech. In one example, the speech of 10 suicidal, 10 depressed, and 10 control subjects was analyzed in great detail. All subjects were males between the ages of 25 and 65. The data for the suicidal subjects were obtained from a large spectrum of recording setups comprising, for example, suicide notes recorded on tape. The other two groups were recorded under more controlled conditions at Vanderbilt University. For each subject the researchers concatenated speech to clips of 30 seconds of uninterrupted speech (i.e., removing pauses larger than 500 ms). Then they analyzed jitter in the voiced parts of the signal as well as glottal flow spectral slope estimates. Both features helped to discern the classes in binary problems with high above-chance accuracies by utilizing simple Gaussian mixture model-based classifiers (e.g., control vs. suicidal 85% correct, depressed vs suicidal 75% correct, control vs. depressed 90% correct). A holdout validation was employed. However, the fact that the recordings were done over such a large variance of recording setups, as acknowledged by the authors themselves, makes it difficult to assess "the accuracy about the extracted speech features and, therefore, the meaningfulness of the classification results." Nevertheless, the fact that the researchers have analyzed real-world data with speech recorded from subjects shortly before they attempted suicide is remarkable and needs to be acknowledged.

Further, a similar approach was utilized to assess the suicide risk of subjects with the same categories. In another example, spectral density features were again used to classify the three classes in three separate binary problems. The data utilized comprised both interview data and read speech. It seems that in those cases, a cross-validation approach was utilized for which it is not clear if the analysis was entirely speaker-independent, as they claim to have used randomized sets of 75% of the data for training and 25% of the data for testing. The observed accuracies are quite high: control vs. suicidal 90.25%, depressed vs. suicidal 88.5%, and control vs. depressed 92.0%.

Another study involved the analysis of glottal flow features as well as prosodic features for the discrimination of depressed read speech of 15 male (nine controls and six depressed subjects, ages 33-50) and 18 female (nine controls and nine subjects, ages 19-57) speakers. In total, 65 sentences were recorded per speaker. The extracted glottal flow features comprised instances such as the minimal point in glottal derivative, maximum glottal opening, start point of glottal opening, and start point of glottal closing. The prosodic features extracted consist of fundamental frequency, energy, and speaking rate. The classification was performed on a leave-one-observation-out paradigm, which has the disadvantage of rendering the analysis highly speaker-dependent. Hence, strong classification results were observed, well above 85% accuracy for male speakers and above 90% for female speakers.

Improved methods for classifying nonverbal characteristics of human speech are needed for the clinical assessment of suicide risk in human subjects. The systems and methods of the present invention address this need by providing excellent discrimination between suicidal and non-suicidal subjects.

SUMMARY

The present invention provides systems and methods for the clinical assessment of suicide risk in a human subject. The systems and methods of the invention are useful to identify a subject at risk of attempting suicide. Accordingly, the systems and methods of the invention are useful as a clinical decision support aid for the diagnosis and treatment of patients at risk of suicide.

The methods of the invention utilize computerized analysis to classify nonverbal behaviors and cues from a human subject and "bin" the subject into one of two categories, suicidal or non-suicidal. The nonverbal behaviors and cues include at least acoustic characteristics of the subject's speech such as prosodic and voice quality-related features. In this context, the term prosodic refers to the rhythm, stress, and intonation of speech and in terms of acoustics involves variations in syllable weight, loudness, and pitch. Prosodic features are generally not confined to any one segment of speech and instead occur in some higher level of an utterance. In one aspect, the present invention provides a discrete set of extracted speech features useful to classify a subject as suicidal or non-suicidal. The discrete set of features includes features identified by the inventors as making significant contributions to the accurate classification of a subject as suicidal or non-suicidal. In one aspect of the invention, the discrete set of features comprises or consists of voice source and voice quality-related features associated with a "breathy voice" or "breathy phonation". The voice features may be extracted from, for example, a recording of a dyadic interview with the subject. In one embodiment, the systems and methods of the invention comprise identifying voice source and voice quality-related features associated with a "breathy voice" or "breathy phonation" type and classifying the subject as suicidal where those features are identified.

In one embodiment, a learning machine is used in the classification step of the systems and methods of the invention. In one embodiment, the method utilizes a discrete set of speech features to classify a subject as suicidal or non-suicidal. In one embodiment, the discrete set of speech features includes 12 or fewer features. In one embodiment, the speech features are selected from the group consisting of voice source and voice quality-related features. In one embodiment, the voice source and voice quality-related features are those associated with a "breathy voice" or "breathy phonation" type. In one embodiment, the voice source and voice quality-related features are selected from one or more of OQ, NAQ and peak features. In one embodiment, the features further comprise articulation rate. In one embodiment, the method further utilizes one or more non-voice video-based features such as gaze, smiles, gestures, and postures. In one embodiment, the method includes voice and, optionally, non-voice features of both the subject and an interviewer.

The present invention provides one or more computer readable, non-transitory memory devices including computer-readable instructions configured to instruct a computerized system to perform a method for assessing suicide risk for a human subject, the method comprising: receiving voice data, which may be recorded voice data, of the subject; and classifying the subject as suicidal or non-suicidal based upon a computerized analysis of one or more nonverbal characteristics of the voice data.

The present invention also provides a computer-implemented method for assessing suicide risk for a human subject, the method comprising: receiving voice data, which may be recorded voice data, of the subject; and classifying the subject as suicidal or non-suicidal based upon a computerized analysis of one or more nonverbal characteristics of the voice data.

The present invention also provides a system for assessing suicide risk for a human subject, the device comprising at least one processor, and a computer-readable medium containing instructions stored thereon which when executed by the at least one processor, perform a method of assessing suicide risk for the human subject method comprising: receiving voice data, which may be recorded voice data, of the subject; and classifying the subject as suicidal or non-suicidal based upon a computerized analysis of one or more nonverbal characteristics of the voice data.

In some embodiments, the classifying step includes binning the subject into one of two categories, suicidal or non-suicidal. In some embodiments, the analysis of nonverbal characteristics of the voice data includes an analysis of acoustic characteristics of speech. In some embodiments, the analysis of nonverbal characteristics of the voice data includes an analysis of prosodic and voice quality-related features of the voice data.

In some embodiments, the prosodic and voice quality data features include one or more of: an acoustic measure of energy in dB (en, $en_{slope}$), an acoustic measure of fundamental frequency ($f_0$), an acoustic measure of peak slope (peak), and an acoustic measure of spectral stationarity (ss). In some embodiments, the prosodic and voice quality data features include an acoustic measure of LF model parameters from time domain estimation methods ($R_a$, $R_k$, $R_g$, EE, OQ, $R_d$).

In some embodiments, the computerized analysis is performed by a learning machine. In some embodiments, the learning machine utilizes hidden Markov models (HMMs). In some embodiments, the learning machine is a support vector machines (SVMs).

In some embodiments, the classifying includes classifying the subject as suicidal based upon the voice data exhibiting the characteristics of a breathy phonation type. The characteristics of a breathy phonation type are determined, for example, based upon one or more acoustic features selected from the group consisting of: OQ, NAQ and peak features. In some embodiments, the breathy phonation type is determined based upon one or more additional acoustic features selected from relatively larger $R_k$ values, and relatively smaller $R_g$ values.

The details of one or more embodiments of the present invention described herein are set forth in the accompanying drawings and the description below. Other features and advantages of the invention described herein will be apparent from the description and drawings, and from the claims.

DETAILED DESCRIPTION

Figure 1:
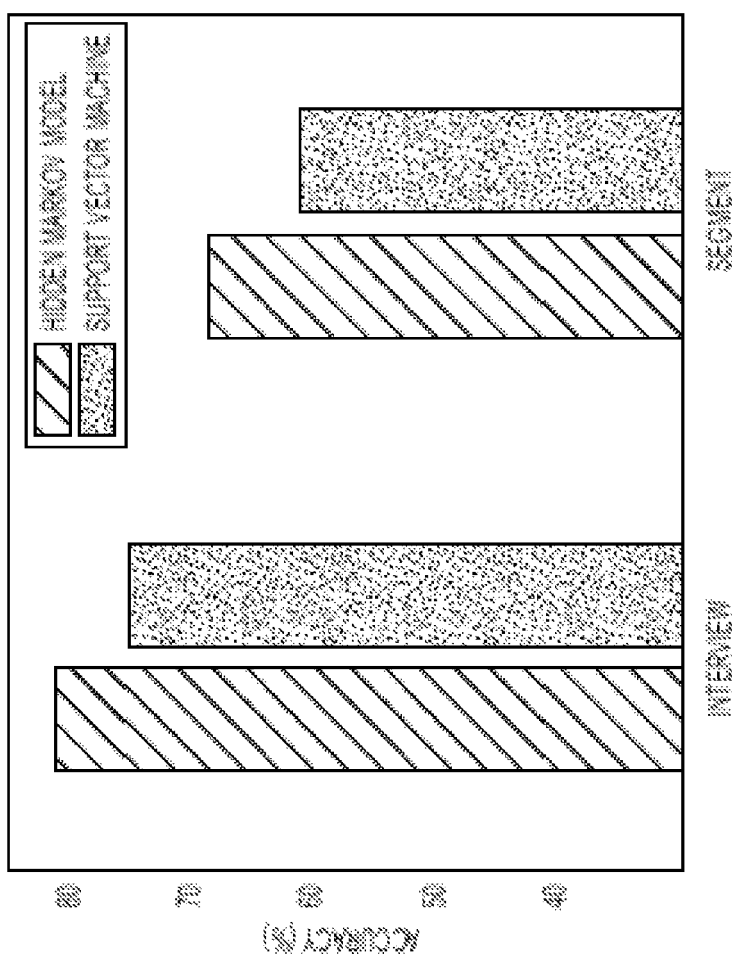
FIG. 1, is a bar-diagram chart representing accuracies in % for the speaker-independent classification experiments on the interview and the utterance level. The performance of hidden Markov models (HMMs) is compared to that of support vector machines (SVMs).

The present invention provides the analysis of novel acoustic features—voice source parameters and features relevant for the identification of voice qualities—that have to date not been utilized to characterize suicidal speech. Additionally, the present invention may be based upon a speaker-independent setup that has not been adequately studied in previous work.

1. Development—Dataset

From March 2011 through August 2011, 60 patients were enrolled in a prospective, controlled trial at the Cincinnati Children's Hospital Medical Center (CCHMC) ED (IRB#2008-1421). Eligible patients were between the ages of 13 and 17 and had come to the ED with suicidal ideation, gestures, attempts, or orthopedic injuries. Patients with orthopedic injuries were enrolled as controls because they are seen as having the fewest biological and neurological perturbations of all of the ED patients. Potential controls were excluded if they had a history of major mood disorder or if first-degree family members had a history of suicidal behavior. The parent(s) or legal guardian(s) had to consent to the study, the patients had to consent, and the physician(s) had to agree that the patients were appropriate for inclusion. Each patient received $75USD compensation for participation.

Data were collected by a trained social worker. Each subject completed the Columbia Suicide Severity Rating Scale (C-SSRS version Jan. 14, 2009) (see K Posner, G. K Brown, B. Stanley, D. A. Brent, K V. Yershova, M. A. Oquendo, G. W. Currier, G. A. Melvin, L. Greenhill, S. Shen, and J. J. Mann, "The Columbia Suicide severity rating scale: Initial validity and internal consistency findings from three multisite studies with adolescents and adults," *The American Journal of Psychiatry*, vol. 168, no. 12, pp. 1266¬1277, December 2011, the contents of which are incorporated herein by reference in their entireties), Suicidal Ideation Questionnaire—Junior (IQ—Jr version 1987) (see W. M. Raynolds, *Suicidal Ideation Questionnaire—Junior*, Odessa, Fla.: Psychological Assessment Resources, 1987, the contents of which are incorporated herein by reference in their entireties), and the Ubiquitous Questionnaire (UQ version 2011) (see J. E Pestian, "A conversation with Edwin Shneidman," *Suicide and Life-Threatening Behavior*, vol. 40, no. 5, pp. 516-523, 1991, the contents of which are incorporated herein by reference in their entireties). The UQ consists of five open-ended questions selected to elicit conversational responses: Does it hurt emotionally? Do you have any fear? Are you angry? Do you have any secrets? Do you have hope?

Potential subject and control patients were identified from the hospitals' electronic medical records. The attending physician was asked to determine whether the patient was appropriate for the study. If so, the parent(s) or legal guardian(s) were approached for consent. After that consent was obtained, the patient was then asked to consent. The same social worker interviewed all subjects.

All interviews were audio recorded and transcribed on a question response level. The recordings were conducted in a private examination room using a tabletop microphone. The audio was sampled at 16 kHz with an average signal-to-noise ratio of 17.2 dB. Due to the fact that the interview was recorded with one single microphone, the speech utterances of both the interviewer and the interviewee were present on the single mono channel of the recordings. Hence, the speech segments were manually annotated using WaveSurfer.[1] The speech turns of a single interlocutor were segmented based on pauses greater than or equal to 300 ms. The resulting speech segments form the basis of the utterance-level analysis in Section 5. Overlapping speech was annotated separately.

[1] http://www.speech.kth.se/wavesurfer/

In an experiment conducted in accordance with the present invention, interviews of 16 adolescents (eight female, eight male) were analyzed with an average age of 15.53 years ($\sigma$=1.5).[2] Eight of those had attempted suicide in the past; eight had not. All of those who had attempted suicide stated that they had wished to end their lives within the previous six months. The average length of the interviews with suicidal adolescents was 778.27 s ($\sigma$=161.21), with 249.96 s (97.95 standard deviation) time spoken by the participant and 332.91 s ($\sigma$=123.65) of pauses on average. The interviews with non-suicidal adolescents lasted for 451.55 s ($\sigma$=107.01) on average, with 123.66 s ($\sigma$=56.95) time spoken by the participant and 170.46 s ($\sigma$=44.43) of pauses on average. The average length of a speech segment is 1.75 s ($\sigma$=0.34) for suicidal adolescents and 1.66 s ($\sigma$=0.52) for non-suicidal adolescents.

[2] This limited number is due to the time-consuming manual segmentation of the speech. In the future we anticipate utilizing the full corpus.

2. Development—Acoustic Measurement's

The participants' prosody and voice quality were analyzed using several acoustic measures, described below. The automatically extracted features were chosen based on previous findings in the literature. The abbreviations for the features used throughout the paper are shown italicized in parentheses after the paragraph headers. All features are sampled at 100 Hz.

Energy in dB ($en$, $en_{slope}$): The energy of each speech frame is calculated on 32 ms windows with a shift of 10 ms. Further, the slope, i.e., the first derivative, of the energy signal is calculated as a measurement of the change of speech intensity.

Fundamental frequency ($f_0$): The method in 'Joint robust voicing detection and pitch estimation based on residual harmonics," by T. Drugman and A. Abeer, in *Proceedings of Interspeech* 2011, 2011, pp. 1973-1976, ISCA, was utilized for tracking based on residual harmonics, which is especially suitable in noisy conditions.

Peak slope (*peak*): This voice quality parameter is based on features derived following a wavelet-based decomposition of the speech signal (see J. Kane and C. Gobi, "Identifying regions of non-modal phonation using features of the wavelet transform," in *Proceedings of Interspeech* 2011. 2011, pp. 177-180, ISCA, the contents of which are incorporated herein by reference in their entireties). The parameter, named peak, is designed to identify glottal closure instances from glottal pulses with different closure characteristics. It was used to differentiate between breathy, modal, and tense voice qualities (see S. Scherer, J. Kane, C. Gobi, and F. Schwenker, "Investigating fuzzy-input fuzzy-output support vector machines for robust voice quality classification," *Computer Speech and Language*, vol. 27, no. 1, pp. 263-287, 2013, the contents of which are incorporated herein by reference in their entireties).

Spectral stationarity ($ss$): To characterize the range of the prosodic inventory used over utterances and the monotonicity of the speech, the so-called spectral stationarity measure ss was used. This measurement has been used as a way of modulating the transition cost used in a dynamic programming method used for $f_0$ tracking (see David Talkin, "A Robust Algorithm for Pitch Tracking," in *Speech coding and synthesis*, W B. Kleijn and K K Paliwal, Eds., pp. 495-517. Elsevier, 1995, the contents of which are incorporated herein by reference in their entireties).

LF model parameters from time domain estimation methods ($R_a$, $R_k$, $R_g$, EE, OQ, $R_d$): The most commonly used acoustic voice source model is the Liljencrants-Fant (LF) model (see G. Fant, J. Liljencrants, and Q. Lin, "A four parameter model of glottal flow," *KTH Speech Transmission Laboratory, Quarterly Report*; vol. 4, pp. 1-13, 1985, the contents of which are incorporated herein by reference in their entireties). It is a five-parameter (including $f_0$) model of differentiated glottal flow.

The model has two segments. The first segment, the open phase, is a sinusoid function. The second segment, which models the return phase, is an exponential function (see C. Gobl and A. NiChasaid, "Amplitude-based source parameters for measuring voice quality," in *Proceedings of ISCA Tutorial and Research Workshop on Voice Quality: Function, Analysis and Synthesis (VOQUAL '03)*, 2003, pp. 151-156, ISCA, and C. Gobl, "The voice source in speech communication," Ph. D. Thesis, *KTH Speech Music and Hearing*, Stockholm, 2003, the contents of which are incorporated herein by reference in their entireties).

The pulse shape of the LF model can be characterized using an amplitude parameter, EE (which is the negative amplitude corresponding to the main excitation), and three time-based parameters $R_a$, $R_k$, and $R_g$. These parameters have been shown to be suitable for characterizing a range of voice qualities, including breathiness and tenseness (see C. Gobl, "A preliminary study of acoustic voice quality correlates," *KTH, Speech Transmission Laboratory, Quarterly Report*; vol. 4, pp. 9-21, 1989, the contents of which are incorporated herein by reference in their entireties).

The open quotient OQ was extracted with:

$$OQ = \frac{1+R_k}{2 \cdot R_g} \quad (1)$$

Further, $R_d$, which is characterizing the basic shape of the LF model (see G. Fart, J. Liljencrants, and Q. Lin, 'The LF-model revisited transformations and frequency domain analysis," *KTH, Speech Transmission Laboratory, Quarterly Report*; vol. 2-3, pp. 119-156, 1995, the contents of which are incorporated herein by reference in their entireties), is extracted following the method described by G. Degottex, A. Roebel, and X. Roder in "Phase minimization for glottal model estimation," IEEE Transactions on Acoustics, *Speech and Language Processing*, vol. 19, no. 5, pp. 1080-1090, 2011 (the contents of which are incorporated herein by reference in their entireties).

Normalized amplitude quotient (NAQ): The normalized amplitude quotient parameter was introduced as a global voice source parameter capable of differentiating breathy to tense voice qualities (see E Alku, T. Backstrom, and E. Vilkman, "Normalized amplitude quotient for parameterization of the glottal flow," *Journal of the Acoustical Society of America*, vol. 112, no. 2, pp. 701-710 , 2002, the contents of which are incorporated herein by reference in their entireties) and is closely related to the $R_d$ parameter described in 'The LF-model revisited transformations and frequency domain analysis," (G. Fart, J. Liljencrants, and Q. Lin, KTH, *Speech Transmission Laboratory, Quarterly Report*; vol. 2-3, pp. 119-156, 1995, the contents of which are incorporated herein by reference in their entireties). Although NAQ is closely related to $R_d$, it is subtly but nevertheless significantly different: NAQ is a direct measure of the glottal flow and glottal flow derivative, whereas $R_d$ is a measure derived from a fitted LF model pulse.

3. Development—Experimental Setup and Results

The capabilities of machine learning algorithms were investigated in a two-fold analysis: the accuracy of hidden Markov models (HMMs) and support vector machines (SVMs) were investigated both on an utterance level and on an interview level. All experiments were conducted using a leave-one-speaker-out validation strategy. Hence, for the training of the classifiers in one fold, the speech samples of one speaker were left out entirely from the training and the classifiers were tested on the speech of the left-out speaker. Two separate classifiers were employed, namely three-state HMMs with three mixtures for each state with full transition matrix and SVMs with radial basis function kernels. The HMMs can take advantage of the sequential and dynamic characteristics of the observations and classify each segment on the full 100 Hz sampled feature vector. The SVMs, on the other hand, do not take previous observations into account and are trained on the median and standard deviations of the features over the single utterances.

4. Development—Interview-Level Analysis

For the interview-level analysis, the decisions of the classifiers for each single speech segment were integrated and form an overall temporally integrated decision for each interview. Based on this, an accuracy of 81.25% was achieved for the HMMs. The HMMs confused only three interviews; one of these misclassifications is a false negative (i.e., suicidal adolescent as non-suicidal). The accuracy of the SVMs was at 75%, with one additional confusion. Again, only one of them was a false negative classification, and it is the same interview as for the HMMs. The results are highlighted in FIG. 1.

5. Development—Utterance-Level Analysis

For the utterance-level analysis, every single speech segment spoken by either a suicidal or non-suicidal adolescent was classified. The overall classification accuracy for the HMMs was 69%. The overall accuracy for the SVMs was slightly lower at 61%.

6. Statistical Evaluation

Statistical tests were conducted on all 12 extracted parameters, as described in Section 2, and their standard deviations. Overall 24 independent t-tests were conducted with the very conservative Bonferroni correction for multiple testing (see O. J. Dunn, "Multiple comparisons among means," *Journal of the American Statistical Association*, vol. 56, pp. 52-64, 1961, the contents of which are incorporated herein by reference in their entireties). Hence, the significance level p is adjusted to be at least p<0.002. Additionally, Hedges' g value is presented as a measure of the effect size found in the data (see L. V. Hedges, "Distribution theory for glass's estimator of effect size and related estimators," *Journal of Educational Statistics*, vol. 6, no. 2, pp. 107-128, 1981, the contents of which are incorporated herein by reference in their entireties). The g value denotes the required shift of the mean of one set to match the mean of the other in magnitudes of standard deviations (see L. V. Hedges, "Distribution theory for glass's estimator of effect size and related estimators," *Journal of Educational Statistics*, vol. 6, no. 2, pp. 107-128, 1981). Values of g>0.4 are considered substantial effects.

Figure 2:
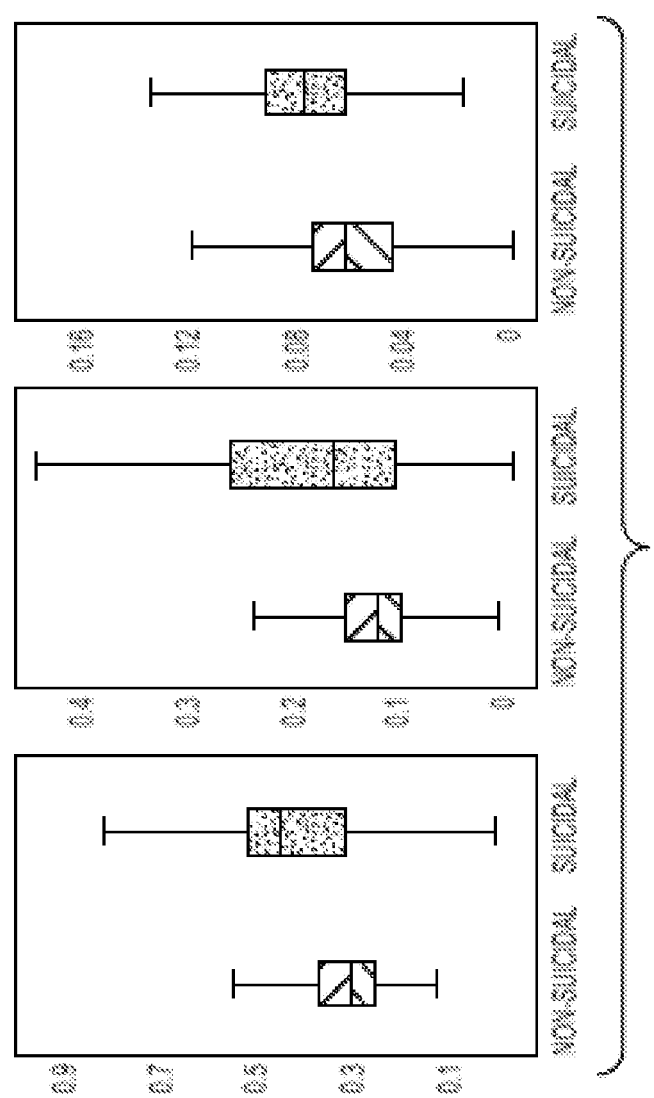
FIG. 2 is a boxplot comparison of three significantly different acoustic measures for the two groups of suicidal and non-suicidal adolescents. All three measures indicate a more breathy voice quality for suicidal subjects.

The features with effect sizes close to the threshold of 0.4 for the suicidal vs. non-suicidal participants are summarized in Table 1 below. All the observed p-values for the listed features are smaller than the mentioned threshold of 0.002. The three strongest effects are plotted in FIG. 2 to visualize the statistical results.

TABLE 1

Statistically significant acoustic measures discerning suicidal and non-suicidal adolescents. The mean and standard deviation (in parentheses) values as well as the effect sizes measured in magnitudes of standard deviations are summarized. All mentioned measures are statistically significantly different for the two groups with a p-value <0.002.

|  | Suicidal | Non-Suicidal | Hedges'g |
|---|---|---|---|
| peak | −.25 (0.04) | −.23 (.05) | −.540 |
| N AQ | .12 (.05) | .09 (.04) | .557 |
| $R_k$ | .36 (.12) | .30 (.10) | .495 |
| $R_g$ | 1.43 (.58) | 1.70 (.64) | −.450 |
| OQ | .42 (.20) | .31 (.13) | .664 |
| N AQ Std. | .08 (.03) | .06 (.02) | .618 |
| E E Std. | .01 (.01) | .01 (.01) | −.448 |
| $R_k$ Std. | .12 (.07) | .10 (.05) | .396 |
| $R_g$ Std. | .61 (.24) | .74 (.34) | −.467 |
| OQ Std. | .19 (.10) | .13 (.05) | .653 |

7. Discussion of Exemplary Embodiments

First, is to assess performance of HMMs and SVMs to classify each subject's voice into the categories of (a) suicidal or (b) non-suicidal. It has been determined that the extracted features may be useful for classifying suicidal and non-suicidal adolescents' speech using standard machine learning algorithms. For the interview-level analysis, classification accuracies of 81.25% for the HMMs and 75% for the SVMs after temporal integration can be achieved. The HMMs confused only three interviews; one of these misclassifications is a false negative (i.e., suicidal adolescent as non-suicidal). These results may be improved by using more sophisticated temporal fusion algorithms and utilizing the full available dataset of 60 interviews.

Next, is to assess the performance of the classifiers on the utterance or segment level of speech. Utilizing classifiers on an utterance level of speech, segments of speech were able to be classified with an average length of about 1.7 s with accuracies of 69% using HMMs and 61% using SVMs. The HMMs, which take advantage of the sequential and dynamic structure of the extracted features, outperform the SVMs, which were trained on the median and standard deviation values of the features over each segment. These results are well above chance level and imply strong differences in the speech characteristics of suicidal and non-suicidal adolescents.

Next is to identify the speech features that contributed the most to the classification. Several statistically significant differences were identified between the speech characteristics of suicidal and non-suicidal adolescents. The voice source and voice quality-related features show the strongest differences between the two groups. In particular, OQ, NAQ, and peak, features that have been associated with voice qualities on the breathy to tense dimension, reveal that suicidal adolescents' voices are often more breathy than the voice of non-suicidal subjects. Additionally, parameters of the LF model, such as $R_k$ and $R_g$ reveal strong statistically significant differences. The larger $R_k$ values suggest a more symmetric glottal pulse, which is again characteristic of a breathy phonation type. Similarly, a smaller $R_g$ indicates a lower frequency of the glottal formant, which is also typical of a breathy voice.

It has also been observed that not only do the speech characteristics of the suicidal and non-suicidal adolescents differ significantly, but also those of the interviewer himself. This phenomenon was observed while annotating the speech turns. In particular, the backchannels provided by the interviewer were significantly different in the two conditions. The observed significant differences include but are not limited to more breathy tones as observed with peak, lower speech intensity (en), higher monotonicity (ss), and larger OQ variations. This adaptation to the participant's voice and context implies that it is desirable to be able to adapt ones voice to the given situation (see S. Kopp, "Social resonance and embodied coordination in face-to-face conversation with artificial interlocutors," *Speech Communication*, vol. 52, no. 6, pp. 587-597, 2010, the contents of which are hereby incorporated by reference in their entireties) (e.g., for spoken human computer interaction systems or virtual agent systems as described in "Perception markup language: Towards a standardized representation of perceived nonverbal behaviors," by S. Scherer, S. Marsella, G. Stratou, Y. Xu, F Morbini, A. Egan, A. Rizzo, and L-P. Morency, in *Proceedings of Intelligent Virtual Agents (IVA '12)*. 2012, LNAI 7502, pp. 455-463, Springer, the contents of which are hereby incorporated by reference in their entireties). Current speech synthesis often lacks the capability to vary the produced voice along the voice quality domain. This finding of adaptation between interviewer and subject has also been confirmed by findings in the literature; for example, it was found that the clinician's behavior was strongly correlated with the patient's severity of depression (see A. L. Bouhuys and R. H. van den Hoofdakker, "The interrelatedness of observed behavior of depressed patients and of a psychiatrist: an ethological study on mutual influence," *Journal of Affective Disorders*, vol. 23, pp. 63074, 1991, the contents of which are hereby incorporated by reference in their entireties).

In sum, (1) based on the few extracted features, the speech of suicidal and non-suicidal adolescents can be identified with a high degree of accuracy in a speaker-independent analysis scenario, and (2) suicidal adolescents exhibit significantly more breathy voice qualities than non-suicidal subjects. Based upon these findings, professional healthcare providers may be provided with objective speech measures of suicidal patients to improve clinical assessments.

Additional analysis may include contextualizing responses of the subjects on a question-level basis—this more fine-grained analysis might reduce the number of errors significantly. Additionally, the body of utilized features may be enriched to incorporate more prosodic features such as the articulation rate as well as video-based features (e.g., gaze, smiles, gestures, and posture) in the interviews (see S. Scherer, G. Stratou, M. Mahmoud, J. Boberg, J. Gratch, A. Rizzo, and L.-P. Morency, "Automatic behavior descriptors for psychological disorder analysis," in *accepted for publication at IEEE Conference on Automatic Face and Gesture Recognition*, 2013, the contents of which are hereby incorporated by reference in their entireties).

Figure 3:
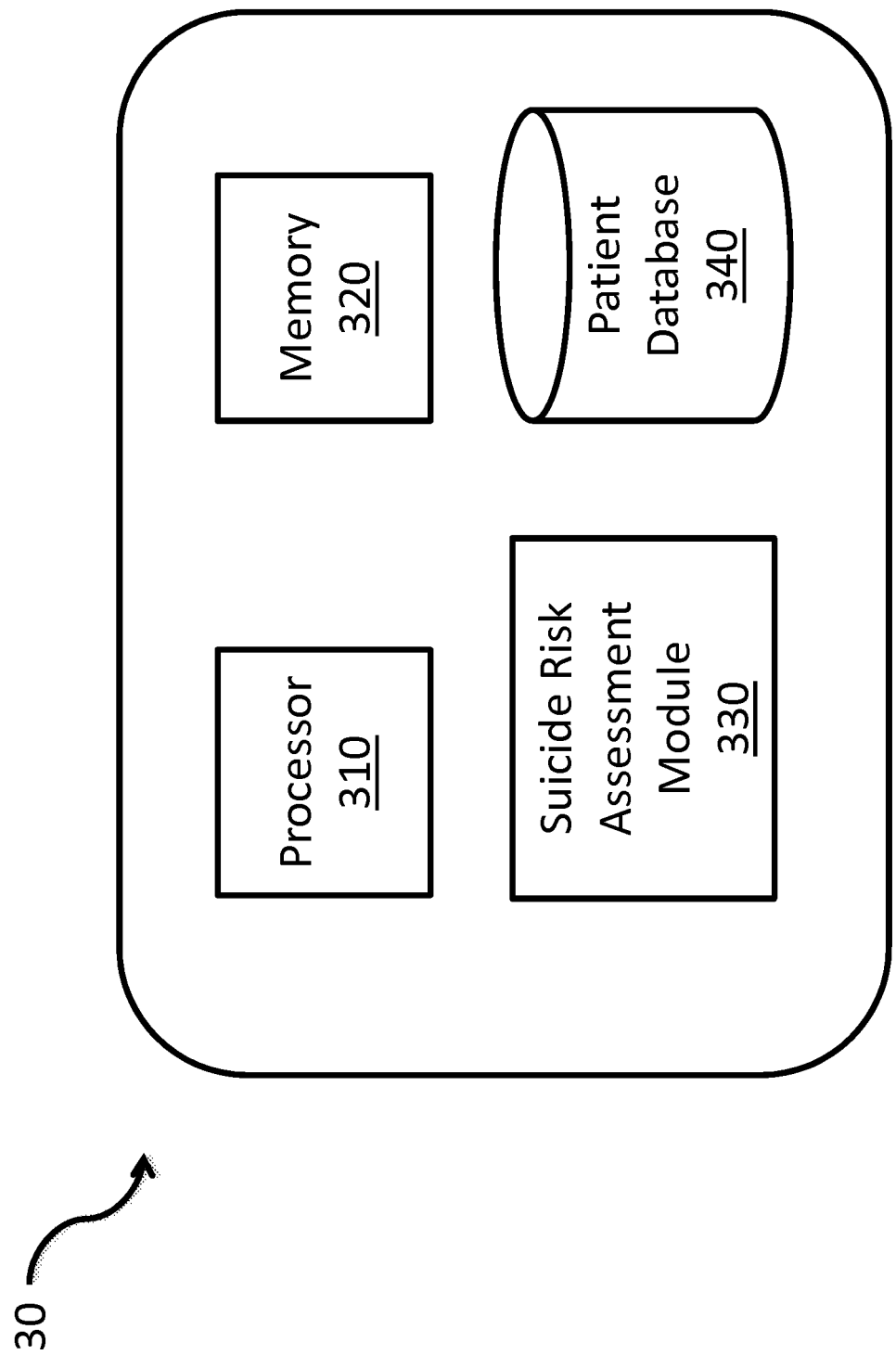
FIG. 3 is a schematic diagram illustrating a computer-implemented system in accordance with the present invention.

FIG. 3 is a schematic diagram illustrating a computer-implemented system in accordance with the present invention. Here, system 30 includes at least one processor 310, at least one memory 320, a suicide risk assessment module 330, and a patient database 340. Suicide risk assessment module 330 can be configured to include instructions which when executed by the at least one processor 310, performs the suicide risk assessment method discussed above. Patient database 340 can include, for example, information on potential and/or selected patients. Such information can include patient data such as identity, suicide history, voice data (e.g., audio recording(s)), and other data such as questionnaire and interview data. Although patient database 340 can be part of the system 30 as shown, it can be implemented remotely in communication with the system 30. In some embodiments, system 30 can include voice data converter that converts analog voice data to digital signal. System 30 can also include one more modules that perform various analysis on the voice data, for example, as discussed above. In some embodiments, system 30 includes a graphical user interface and/or display to the user. In some embodiments, system 30 can be accessed by one or more devices to access the information stored on the system.

To provide additional context for various aspects of the current disclosure, the following discussion is intended to provide a brief, general description of a suitable computing environment in which the various aspects of the current disclosure may be implemented. While one embodiment of the current disclosure relates to the general context of computer-executable instructions that may run on one or more computers, those skilled in the art will recognize that the embodiments also may be implemented in combination with other program modules and/or as a combination of hardware and software.

Generally, program modules include routines, programs, components, data structures, etc., that perform particular tasks or implement particular abstract data types. Moreover, those skilled in the art will appreciate that aspects of the inventive methods may be practiced with other computer system configurations, including single-processor or multi-processor computer systems, minicomputers, mainframe computers, as well as personal computers, hand-held wireless computing devices, microprocessor-based or programmable consumer electronics, and the like, each of which can be operatively coupled to one or more associated devices. Aspects of the current disclosure may also be practiced in distributed computing environments where certain tasks are performed by remote processing devices that are linked through a communications network. In a distributed computing environment, program modules may be located in both local and remote memory storage devices.

A computer may include a variety of computer readable media. Computer readable media may be any available media that can be accessed by the computer and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media (i.e., non-transitory computer readable media) includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which may be used to store the desired information and which may be accessed by the computer.

An exemplary environment for implementing various aspects of the current disclosure may include a computer that includes a processing unit, a system memory and a system bus. The system bus couples system components including, but not limited to, the system memory to the processing unit. The processing unit may be any of various commercially available processors. Dual microprocessors and other multi processor architectures may also be employed as the processing unit.

The system bus may be any of several types of bus structure that may further interconnect to a memory bus (with or without a memory controller), a peripheral bus, and a local bus using any of a variety of commercially available bus architectures. The system memory may include read only memory (ROM) and/or random access memory (RAM). A basic input/output system (BIOS) is stored in a non-volatile memory such as ROM, EPROM, EEPROM, which BIOS contains the basic routines that help to transfer information between elements within the computer, such as during start-up. The RAM may also include a high-speed RAM such as static RAM for caching data.

The computer may further include an internal hard disk drive (HDD) (e.g., EIDE, SATA), which internal hard disk drive may also be configured for external use in a suitable chassis, a magnetic floppy disk drive (FDD), (e.g., to read from or write to a removable diskette) and an optical disk drive, (e.g., reading a CD-ROM disk or, to read from or write to other high capacity optical media such as the DVD). The hard disk drive, magnetic disk drive and optical disk drive may be connected to the system bus by a hard disk drive interface, a magnetic disk drive interface and an optical drive interface, respectively. The interface for external drive implementations includes at least one or both of Universal Serial Bus (USB) and IEEE 1394 interface technologies.

The drives and their associated computer-readable media may provide nonvolatile storage of data, data structures, computer-executable instructions, and so forth. For the computer, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the current disclosure.

A number of program modules may be stored in the drives and RAM, including an operating system, one or more application programs, other program modules and program data. All or portions of the operating system, applications, modules, and/or data may also be cached in the RAM. It is appreciated that the invention may be implemented with various commercially available operating systems or combinations of operating systems.

It is within the scope of the disclosure that a user may enter commands and information into the computer through one or more wired/wireless input devices, for example, a touch screen display, a keyboard and/or a pointing device, such as a mouse. Other input devices may include a microphone (functioning in association with appropriate language processing/recognition software as known to those of ordinary skill in the technology), an IR remote control, a joystick, a game pad, a stylus pen, or the like. These and other input devices are often connected to the processing unit through an input device interface that is coupled to the system bus, but may be connected by other interfaces, such as a parallel port, an IEEE 1394 serial port, a game port, a USB port, an IR interface, etc.

A display monitor or other type of display device may also be connected to the system bus via an interface, such as a video adapter. In addition to the monitor, a computer may include other peripheral output devices, such as speakers, printers, etc.

The computer may operate in a networked environment using logical connections via wired and/or wireless communications to one or more remote computers. The remote computer(s) may be a workstation, a server computer, a router, a personal computer, a portable computer, a personal digital assistant, a cellular device, a microprocessor-based entertainment appliance, a peer device or other common network node, and may include many or all of the elements described relative to the computer. The logical connections depicted include wired/wireless connectivity to a local area network (LAN) and/or larger networks, for example, a wide area network (WAN). Such LAN and WAN networking environments are commonplace in offices, and companies, and facilitate enterprise-wide computer networks, such as intranets, all of which may connect to a global communications network such as the Internet.

The computer may be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi (such as IEEE 802.11x (a, b, g, n, etc.)) and Bluetooth™ wireless technologies. Thus, the communication may be a predefined structure as with a conventional network or simply an ad hoc communication between at least two devices.

The system may also include one or more server(s). The server(s) may also be hardware and/or software (e.g., threads, processes, computing devices). The servers may house threads to perform transformations by employing aspects of the invention, for example. One possible communication between a client and a server may be in the form of a data packet adapted to be transmitted between two or more computer processes. The data packet may include a cookie and/or associated contextual information, for example. The system may include a communication framework (e.g., a global communication network such as the Internet) that may be employed to facilitate communications between the client(s) and the server(s).

Following from the above description and summaries, it should be apparent to those of ordinary skill in the art that, while the methods and apparatuses herein described constitute exemplary embodiments of the current disclosure, it is to be understood that the inventions contained herein are not limited to the above precise embodiments and that changes may be made without departing from the scope of the inventions. Likewise, it is to be understood that it is not necessary to meet any or all of the identified advantages or objects of the inventions disclosed herein in order to fall within the scope of the inventions, since inherent and/or unforeseen advantages of the current disclosed embodiments may exist even though they may not have been explicitly discussed herein.

The invention claimed is:

1. A computer-implemented method for assessing suicide risk in a human subject, the method comprising the steps of:
    receiving voice data of the subject; and
    classifying the subject as suicidal or non-suicidal based upon a computerized analysis of one or more nonverbal characteristics of the voice data performed on a support vector machine (SVM) that utilizing hidden Markov models (HMMs),
    the nonverbal characteristics of the voice data including prosodic and voice quality-related features of the voice data selected from one or more of an acoustic measure of energy in dB (en, $en_{slope}$), an acoustic measure of fundamental frequency ($f_0$), an acoustic measure of peak slope (peak), and an acoustic measure of spectral stationarity (ss),
    the prosodic and voice quality features including an acoustic measure of Liljencrants-Fant (LF) model parameters from time domain estimation methods, including three time-based parameters ($R_a$, $R_k$ and $R_g$) an amplitude parameter (EE), an Open Quotient (OQ), and a parameter characterizing the basic shape of the LF model ($R_d$) and
    the classifying including classifying the subject as being suicidal based upon the voice data exhibiting the characteristics of a breathy phonation type.

2. The method of claim 1, wherein the characteristics of a breathy phonation type are determined based upon one or more acoustic features selected from the group consisting of: Open Quotient (OQ), Normalized Amplitude Quotient (NAQ) and peak slope (peak).

3. The method of claim 2, wherein the characteristics of a breathy phonation type are determined based upon one or more acoustic features selected from relatively larger $R_k$ values and relatively smaller $R_g$ values.

4. A system for assessing suicide risk for a human subject, the system comprising at least one processor, and a non-transitory computer-readable medium containing instructions stored thereon which when executed by the at least one processor, perform a method of assessing suicide risk for the human subject, the method comprising:
    receiving voice data of the subject; and
    classifying the subject as suicidal or non-suicidal based upon a computerized analysis of one or more nonverbal characteristics of the voice data performed on a support vector machine (SVM) utilizing hidden Markov models (HMMs),
    the nonverbal characteristics of the voice data including prosodic and voice quality-related features of the voice data selected from one or more of an acoustic measure of energy in dB (en, $en_{slope}$), an acoustic measure of fundamental frequency ($f_0$), an acoustic measure of peak slope (peak), and an acoustic measure of spectral stationarity (ss),
    the prosodic and voice quality features including an acoustic measure of Liljencrants-Fant (LF) model parameters from time domain estimation methods, including three time-based parameters ($R_a$, $R_k$, $R_g$) an amplitude parameter (EE), an Open Quotient (OQ), and a parameter characterizing the basic shape of the LF model ($R_d$) and
    the classifying including classifying the subject as being suicidal based upon the voice data exhibiting the characteristics of a breathy phonation type.

5. The system of claim 4, wherein the characteristics of a breathy phonation type are determined based upon one or more acoustic features selected from the group consisting of: Open Quotient (OQ), Normalized Amplitude Quotient (NAQ) and peak slope (peak) features.

6. The system of claim 5, wherein the characteristics of a breathy phonation type are determined based upon one or more acoustic features selected from relatively larger $R_k$ values, and relatively smaller $R_g$ values.

* * * * *